United States Patent
Parris

(10) Patent No.: US 7,968,501 B2
(45) Date of Patent: Jun. 28, 2011

(54) CROSSLINKER SUSPENSION COMPOSITIONS AND USES THEREOF

(75) Inventor: Michael D. Parris, Richmond, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 710 days.

(21) Appl. No.: 11/554,917

(22) Filed: Oct. 31, 2006

(65) Prior Publication Data

US 2008/0103068 A1    May 1, 2008

(51) Int. Cl.
   *C09K 8/60*    (2006.01)
   *C23G 1/06*    (2006.01)
   *C09K 8/68*    (2006.01)
   *C09K 8/74*    (2006.01)

(52) U.S. Cl. ......... 507/261; 507/266; 507/269; 507/273

(58) Field of Classification Search .................. 507/261, 507/266, 269, 273
See application file for complete search history.

(56) References Cited

U.S. PATENT DOCUMENTS

| | | | |
|---|---|---|---|
| 5,082,579 A | 1/1992 | Dawson | |
| 5,145,590 A | 9/1992 | Dawson | |
| 5,160,643 A | 11/1992 | Dawson | |
| 6,225,264 B1 | 5/2001 | Moorhouse | |
| 6,251,838 B1 | 6/2001 | Moorhouse | |
| 6,743,756 B2 | 6/2004 | Harris, Jr. | |
| 6,823,939 B2 | 11/2004 | Bouwmeester | |
| 7,084,096 B2 | 8/2006 | Harris, Jr. | |
| 7,199,084 B2 | 4/2007 | Parris | |
| 2003/0181532 A1* | 9/2003 | Parris et al. | 516/20 |
| 2003/0220203 A1* | 11/2003 | Harris et al. | 507/200 |
| 2006/0205605 A1* | 9/2006 | Dessinges et al. | 507/211 |

FOREIGN PATENT DOCUMENTS

EP     1331358 A1    7/2003

* cited by examiner

*Primary Examiner* — Timothy J. Kugel
*Assistant Examiner* — Atnaf Admasu
(74) *Attorney, Agent, or Firm* — Rachel Greene; David Cate; Jeff Griffin

(57) ABSTRACT

A delayed crosslinker system useful in downhole treatment fluids is disclosed. The crosslinker system comprises water-reactive solids, a non-aqueous, non-oily, hygroscopic liquid, a suspension aid, and an optional polyol. The crosslinker system may be prepared at a remote location and transported to the site of its intended use. There it may be pumped into a formation and activated when a gel fluid is introduced into the wellbore, only then forming a high viscosity treatment fluid. Thus, the amount of energy required for pumping is reduced. The optional polyol component increases crosslink delay and enhances the rate of viscosity after high shear (shear recovery).

25 Claims, No Drawings

CROSSLINKER SUSPENSION COMPOSITIONS AND USES THEREOF

FIELD OF THE INVENTION

The invention relates to slurries of water-reactive solids such as borates dispersed in carrier liquids.

BACKGROUND OF THE INVENTION

Hydraulic fracturing involves literally breaking or fracturing a portion of the surrounding strata, by injecting a specialized fluid into the well bore directed at the face of the geologic formation at pressures sufficient to initiate and extend a fracture in the formation. Certain commonly used fracturing treatments generally comprise at least three principal components: a carrier fluid, a polymer, and a proppant. Many further comprise a crosslinker.

The purpose of these fracturing fluids is to first create and extend a fracture, and then once it is opened sufficiently, to deliver proppant into the fracture, which keeps the fracture from closing once the pumping operation is completed. The carrier fluid is the means by which proppant and breaker are carried into the formation.

A typical fracturing fluid can be prepared by blending a polymer, often a polysaccharide, with an aqueous solution. The purpose of the polymer is to increase the viscosity of the fracturing fluid and to thicken the aqueous solution so that solid particles of proppant can be suspended in the solution for delivery into the fracture. If a crosslinking agent is added to the fracturing treatments, the agent further increases the viscosity of the fluid by crosslinking the polymer.

In addition to being useful in fracturing, fluid that comprises a polymer and crosslinker can also be useful in the workover of a hydrocarbon production well to improve production. After the treatment, a gel formed by the workover fluid can be intentionally degraded or remain as a permanent plug.

Fracturing fluid must be chemically stable and sufficiently viscous to suspend the proppant while it is sheared and heated in surface equipment, well tubulars, perforations and the fracture; otherwise, premature settling of the proppant occurs, jeopardizing the treatment. Crosslinkers join polymer chains for greater thickening, but in certain instances, a delay in crosslinking is advantageous.

For example, a delayed crosslinker can be placed downhole prior to crosslinking; the gel fluid is prepared on the surface, then crosslinks after being introduced into a wellbore which penetrates a subterranean formation, forming a high viscosity treating fluid therein. The delay in crosslinking is beneficial in that the amount of energy required to pump the fluids can be reduced, the penetration of certain fluids can be improved, and shear and friction damage to polymers can be reduced. By delaying crosslinking, crosslinkers can be more thoroughly mixed with the polymer fluid prior to crosslink initiation, providing more effective crosslinks, more uniform distribution of crosslinks, and better gel properties.

U.S. Pat. No. 5,145,590 to Dawson discloses a solution and method of use for providing controlled delay and improved high temperature gel stability of borated fracturing fluids.

Some of the primary delayed borate fluid systems used in United States, currently the largest fracturing market, have several deficiencies. Certain fluids are crosslinked with suspensions of finely ground anhydrous borax in petroleum distillate carrier fluids, suspended by polymers. These systems, due to their suspension flow characteristics, cannot be pumped with most equipment and are generally unsuccessful when used with existing blenders and mixers. Modifications of existing equipment or the use of skids specifically designed for pumping specific high viscosity fluids have typically been required. Still, a recurrent problem is posed by the formation of scale and borate deposits on the surfaces of lines and equipment that can result from the presence of moisture in the system leading to the crystallization of borate hydrates. There have been numerous major failures in field operations relating to the difficulty in pumping such systems.

To avoid failures of the pumping and mixing equipment handling these borate fluid systems, it is important to transport and place the fluid systems downhole before they begin crosslinking. However, a crosslinker that is suspended in a hydrocarbon-based oil will raise environmental concerns. For example, oil-containing liquids are likely to fail two key US Environmental Protection Agency (EPA) tests for use in the Gulf of Mexico: EPA Method 1664, Oil and Grease, and EPA Part 435/Appendix A/Supbpart 1: Static Sheen.

Borate systems that pass the key EPA tests described above can still present pumping and mixing problems if the crosslinker suspension is too viscous. U.S. Pat. No. 6,743,756 to Harris teaches liquid suspensions of particles in non-aqueous liquids such as polyglycol that are said to resist settling or separation of the suspended solids over long periods of time. However, polyglycol based suspensions are not sufficiently flowable to permit the use of pumps, mixing equipment and tanks that are typical in well treatment fluid service.

It can thus be seen that there is a need in the art for a crosslinker that can be processed without introducing oil into the treatment fluid, that is in the form of flowable liquid or pumpable suspension, that can pass the two key EPA mandated tests for use in the Gulf of Mexico, and that can inhibit scaling and plugging associated with borate crosslinker systems.

SUMMARY OF THE INVENTION

A slurry vehicle embodiment can be useful to deliver water-reactive solids into a downhole treatment fluid, and can include a readily flowable concentrated suspension of particulated water-reactive solids dispersed in a non-aqueous, non-oily, hygroscopic liquid with a suspension aid, wherein the solids are insoluble in the liquid.

The slurry vehicle can have a viscosity at 25° C. and a shear rate of 3 sec$^{-1}$ less than about 100 cP. The solids can have a non-colloidal particle size less than about 400 mesh. The slurry can be essentially free of wax and oil.

The solids can include a slowly soluble boron-containing mineral. In an embodiment, the slowly soluble boron-containing mineral can include anhydrous borax.

The hygroscopic liquid can include glycol. In an embodiment, the glycol can have a viscosity less than 50 cP and can be present in liquid phase in a concentration of at least 50 percent by weight of the liquid phase. In an embodiment, the glycol can be selected from the group consisting of alkylene glycol, dialkylene glycol, trialkylene glycol, alkylene glycol monoalkyl ether, dialkylene glycol monoalkyl ether, trialkylene glycol monoalkyl ether, and the like or combinations thereof. In another embodiment, the glycol can be selected from the group consisting of ethylene glycol, diethylene glycol, triethylene glycol, propylene glycol, dipropylene glycol, tripropylene glycol, C1 to C8 monoalkyl ethers thereof, and the like or combinations thereof. In another embodiment, the glycol can be selected from the group consisting of 1,3-propanediol, 1,4-butanediol, 1,4-butenediol, thiodiglycol, 2-methyl-1,3-propanediol, pentane-1,2-diol, pentane-1,3-diol, pentane-1,4-diol, pentane-1,5-diol, pentane-2,3-diol, pentane-2,4-diol, hexane-1,2-diol, heptane-1,2-diol, 2-methylpentane-2,4-diol, 2-ethylhexane-1,3-diol, C1 to C8 monoalkyl ethers thereof, and the like or combinations thereof. In another embodiment, the glycol can include a glycol ether having the molecular formula R—OCH$_2$CHR$^1$OH, where R is substituted or unsubstituted hydrocarbyl of about 1 to 8 carbon atoms and R$^1$ is hydrogen or alkyl of about 1 to 3 carbon atoms.

The suspension aid can be selected from the group consisting of silica, polymeric suspending agents, organophyllic clay, thixotropic agents, polyacrylic acid, an ether cellulosic derivative, polyvinyl alcohol, carboxymethylmethylcellulose, polyvinyl acetate, thiourea crystals, and the like or combinations thereof.

The slurry vehicle can further include a polyol-based component. In an embodiment, the polyol-based component can be selected from the group consisting of sorbitol, mannitol, sodium gluconate, and the like or combinations thereof. In another embodiment, the polyol can be present at from about 5 to about 20 percent by weight of the slurry.

A well treatment fluid embodiment can include a mixture of an aqueous solution of a hydrated polymer capable of gelling in the presence of borate ions and a non-oily slurry of anhydrous borax in liquid glycol with a suspension aid and an optional polyol.

The well treatment fluid can have a viscosity at 25° C. less than 35 cP. The well treatment fluid can include from about 15 to about 25 weight percent solids by weight of the fluid. The slurry can be essentially free of wax and oil.

In an embodiment, the glycol can be selected from the group consisting of alkylene glycol, dialkylene glycol, trialkylene glycol, alkylene glycol monoalkyl ether, dialkylene glycol monoalkyl ether, trialkylene glycol monoalkyl ether, and the like or combinations thereof. In another embodiment, the glycol can be selected from the group consisting of ethylene glycol, diethylene glycol, triethylene glycol, propylene glycol, dipropylene glycol, tripropylene glycol, C$_1$ to C8 monoalkyl ethers, and the like or combinations thereof. In another embodiment, the glycol can be selected from the group consisting of 1,3-propanediol, 1,4-butanediol, 1,4-butenediol, thiodiglycol, 2-methyl-1,3-propanediol, pentane-1,2-diol, pentane-1,3-diol, pentane-1,4-diol, pentane-1,5-diol, pentane-2,3-diol, pentane-2,4-diol, hexane-1,2-diol, heptane-1,2-diol, 2-methylpentane-2,4-diol, 2-ethylhexane-1,3-diol, C1 to C8 monoalkyl ethers thereof, and combinations thereof. In another embodiment, the glycol can include a glycol ether having the molecular formula R—OCH$_2$CHR$^1$OH, where R is substituted or unsubstituted hydrocarbyl of about 1 to 8 carbon atoms and R$^1$ is hydrogen or alkyl of about 1 to 3 carbon atoms.

In an embodiment, the polyol can be present in an amount effective for shear recovery. In another embodiment, the polyol can be present at from 5 to 10 percent by weight of the fluid.

A method embodiment can introduce a delayed gelling treatment fluid to a subterranean formation treatment and can include: preparing a readily flowable delayed gelling agent including a non-oily slurry of anhydrous borax in liquid glycol with a suspension aid and an optional polyol; blending together an aqueous fluid and a hydratable polymer capable of gelling in the presence of borate ions to form a hydrated base fluid; mixing the hydrated base fluid with the delayed gelling agent; pumping the resulting mixture downhole into the formation to form a gel by crosslinking the hydrated polymer with borate ions from the delayed gelling agent; wherein the gel formation is effectively delayed during the pumping step until about when the mixture is introduced to the formation.

In an embodiment, the polyol can be present in an amount effective for shear recovery. In another embodiment, the polyol can be present at from about 2 to about 4 pounds per thousand gallons of the hydrated base fluid. In another embodiment, the polyol can be present at from about 6 to about 15 pounds per thousand gallons of the hydrated base fluid.

The fluid can further have a formation temperature above about 35° C. The gelling time can be from about 2 to about 12 minutes. Crosslinking can be delayed for about 1 to about 20 minutes from time of mixing the hydrated polymer with the borate. The gel strength at 10 seconds can be less than about 1.5×10$^3$ Pa.

DETAILED DESCRIPTION OF EMBODIMENTS OF THE INVENTION

The description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range.

The following terms will be used in this document: A "treating fluid" or "treatment fluid" is a fluid that is used for treating a well. "Non-oily" describes a composition that passes two key EPA-mandated tests for use in the Gulf of Mexico: EPA Method 1664, Oil and Grease, and EPA Part 435/Appendix A/Subpart 1: Static Sheen. "Essentially free of wax and oil" describes a composition that is generally less than 0.1 weight percent oil, wax or a combination thereof, and to which neither wax nor oil components have been added. "Shear recovery" is the rate of viscosity recovery after high shear; that is, the recovery of viscosity as shearing is ceased.

As used herein, "polymer" may be used to refer to homopolymers, copolymers, interpolymers, terpolymers, and the like. Likewise, a "copolymer" may represent a polymer comprising at least two monomers, optionally with other monomers, and may be a random, alternating, block or graft copolymer. By referring to a polymer as comprising a monomer, it is meant that the monomer is present in the polymer in the polymerized form of the monomer or in the derivative form the monomer.

A "crosslinker" or "crosslinking agent" is a compound mixed with a base-gel fluid to create a viscous gel. Under proper conditions, the crosslinker reacts with a multiple-strand polymer to couple the molecules, creating a crosslinked polymer fluid of high, but closely controlled, viscosity.

The term "well" as used in this specification includes the surface site from which a well bore has been drilled to a hydrocarbon-bearing formation and the well bore itself, as well as the hydrocarbon-bearing formation that surrounds the well bore.

The term "hydraulic fracturing" as used in the present application refers to a technique that involves pumping fluids into a well at pressures and flow rates high enough to split the rock and create opposing cracks extending up to 300 m (1000 feet) or more from either side of the borehole. Later, sand or ceramic particulates, called "proppant," are carried by the fluid to pack the fracture, keeping it open once pumping stops and pressures decline.

By definition, a "slurry" is a mixture of suspended solids and liquids. The slurry that is used in the composition embodiments of the present invention can be prepared at or near the site of the well bore or can be prepared a remote location and shipped to the site of its intended use. Methods of preparing slurries are known in the art. It is preferred that the slurry be prepared offsite, since this can reduce the expense associated with the transport of equipment, materials and expertise necessary to the preparation of a slurry on site.

The term "non-aqueous" as used in the present application in one sense refers to a composition to which no water has been added, and in another sense refers to a composition the liquid phase of which comprises no more than 1, 0.5, 0.1 or 0.01 weight percent water based on the weight of the liquid phase.

The term "mesh" as used in the present application means the Tyler mesh size. The Tyler mesh size is a scale of particle size in powders. The particle size can be categorized by sieving or screening, that is, by running the sample through a specific sized screen. The particles can be separated into two or more size fractions by stacking the screens, thereby determining the particle size distribution.

Solids suitable in certain embodiments of the present invention are water-reactive and at least substantially, if not essentially insoluble, at ambient surface conditions, in liquids used for the slurry. Suitable solids may also be slowly soluble. In certain embodiments, the solids will include a slowly soluble boron-containing mineral. These may include borates, such as anhydrous borax and borate hydrate.

The hygroscopic liquid suitable in the present invention is generally non-aqueous and non-oily. The liquid should have strong affinity for water to keep the water away from any crosslinking agent, which would otherwise reduce the desired delay of crosslinking, i.e. accelerate the gelation. Glycols, including glycol-ethers, and especially including glycol-partial-ethers, represent one class of hygroscopic liquids. Specific representative examples of ethylene and propylene glycols include ethylene glycol, diethylene glycol, triethylene glycol, propylene glycol, dipropylene glycol, tripropylene glycol, C1 to C8 monoalkyl ethers thereof, and the like. Additional examples include 1,3-propanediol, 1,4-butanediol, 1,4-butenediol, thiodiglycol, 2-methyl-1,3-propanediol, pentane-1,2-diol, pentane-1,3-diol, pentane-1,4-diol, pentane-1,5-diol, pentane-2,3-diol, pentane-2,4-diol, hexane-1,2-diol, heptane-1,2-diol, 2-methylpentane-2,4-diol, 2-ethylhexane-1,3-diol, C1 to C8 monoalkyl ethers thereof, and the like.

In one embodiment, the hygroscopic liquid includes glycol ethers with the molecular formula $R-OCH_2CHR^1OH$, where R is substituted or unsubstituted hydrocarbyl of about 1 to 8 carbon atoms and $R^1$ is hydrogen or alkyl of about 1 to 3 carbon atoms. Specific representative examples include solvents based on alkyl ethers of ethylene and propylene glycol, commercially available under the trade designation CELLOSOLVE, DOWANOL, and the like. Note that it is conventional in the industry to refer and use such alkoxyethanols as solvents, but in the present invention the slurried solids should not be soluble in the selected solvent.

The hygroscopic liquid can have a low viscosity, e.g. less than 50 cP (50 mPa-s), less than 35 cP (35 mPa-s), or less than 10 cP (10 mPa-s) in different embodiments. The hygroscopic liquid can contain a sufficient proportion of the glycol to maintain hygroscopic characteristics depending on the humidity and temperature of the ambient air to which it may be exposed, i.e. the hygroscopic liquid should contain glycol in a proportion at or preferably exceeding the relative humectant value thereof. As used herein, the relative humectant value is the equilibrium concentration in percent by weight of the glycol in aqueous solution in contact with air at ambient temperature and humidity, e.g. 97.2 weight percent propylene glycol for air at 48.9° C. (120° F.) and 10% relative humidity, or 40 weight percent propylene glycol for air at 4.4° C. (40° F.) and 90% relative humidity. In other embodiments, the hygroscopic liquid can comprise at least 50 percent by weight in the liquid phase (excluding any insoluble or suspended solids) of the glycol, at least 80 percent by weight, at least 90 percent by weight, at least 95 percent by weight, or at least 98 percent by weight.

The suspension aid of the present invention helps to distance the suspended solids from each other, thereby inhibiting the solids from clumping and falling out of the suspension. The suspension aid can include silica, organophyllic clay, polymeric suspending agents, other thixotropic agents or a combination thereof. In certain embodiments the suspension aid will include polyacrylic acid, an ether cellulosic derivative, polyvinyl alcohol, carboxymethylmethylcellulose, polyvinyl acetate, thiourea crystals or a combination thereof. As a crosslinked acrylic acid based polymer, there may be mentioned the liquid or powdered polymers available commercially under the trade designation CARBOPOL. As an ether cellulosic derivative, there may be mentioned hydroxypropyl cellulose. Suitable organophyllic clays include kaolinite, halloysite, vermiculite, chlorite, attapullgite, smectite, montmorillonite, bentonite, hectorite or a combination thereof.

Preferred embodiments of the present invention will include one or more polyol compounds, including sorbitol, mannitol, sodium gluconate and combinations thereof. This optional feature provides further performance improvement in the system through increased crosslink delay, enhanced gel strength when the polymer is less than fully hydrated, and enhanced rate of shear recovery. It is preferred that the polyol be present in an amount effective for improved shear recovery. Further, the polyol can be present in an amount that is not effective as a breaker or breaker aid.

In certain embodiments of the present invention, the well treatment fluid comprises at least one polymer and at least one crosslinker, the polymer and crosslinker reacting under proper conditions to produce a crosslinked polymer. The polymer should not prematurely crosslink before the desired set time. The polymer should generally be hydratable, such as a polysaccharide.

Some nonlimiting examples of suitable polymers include guar gums, high-molecular weight polysaccharides composed of mannose and galactose sugars, or guar derivatives such as hydropropyl guar (HPG), carboxymethyl guar (CMG), and carboxymethylhydroxypropyl guar (CMHPG).

Cellulose derivatives such as hydroxyethylcellulose (HEC) or hydroxypropylcellulose (HPC) and carboxymethylhydroxyethylcellulose (CMHEC) may also be used. have been shown to be useful as viscosifying agents as well. Synthetic polymers such as, but not limited to, polyacrylamide and polyacrylate polymers and copolymers, as well as diutans, may be useful for high-temperature applications.

Preferred classes of hydratable polymers include galactomannan polymers (guar) and derivatized galactomannan polymers (i.e. guar derivatives such as hydropropyl guar (HPG), carboxymethyl guar (CMG), and carboxymethylhydroxypropyl guar (CMHPG)); biopolymers such as xanthan, diutan, and scleroglucan; hydroxycelluloses; hydroxyalkyl celluloses (i.e. hydroxyethylcellulose (HEC) or hydroxypropylcellulose (HPC)); alkoxyalkylhydroxyalkylcellulose (i.e. carboxymethylhydroxyethylcellulose (CMHEC)); cationic functional guars and celluloses; hydrophobically modified guars and celluloses; polyvinyl alcohol polymers (such as homopolymers of vinyl alcohol and copolymers of vinyl alcohol and vinyl acetate); and polymers (such as homopolymers, copolymers, and terpolymers) that are the product of a polymerization reaction comprising one or more monomers selected from the group consisting of vinyl pyrrolidone, 2-acrylamido-2-methylpropanesulfonic acid, acrylic acid and acrylamide, among others. Certain polyvinyl alcohol polymers can be prepared by hydrolyzing vinyl acetate polymers. Preferably the polymer is water-soluble.

Some embodiments may further include a delay additive. A delay additive is a material which attempts to bind chemically to borate ions produced by the crosslinker in solution, whereby a hydrated polymer is forced to compete with the delay additive for the borate ions. The effectiveness of the delay additive in chemical bonding can be pH dependent.

Preferably, the delay additive is selected from the group consisting of dialdehydes having about 1 to 4 carbon atoms, keto aldehydes having about 1 to 4 carbon atoms, hydroxyl aldehydes having about 1 to 4 carbon atoms, ortho substituted aromatic dialdehydes and ortho substituted aromatic hydroxyl aldehydes.

Most preferably, the delay additive is selected from the group consisting of dialdehydes having about 2 to 4 carbon atoms, keto aldehydes having about 3 to 4 carbon atoms, hydroxy aldehydes having about 2 to 4 carbon atoms, ortho substituted aromatic dialdehydes and ortho substituted aromatic hydroxyl aldehydes. Preferred delay additives include, for instance, glyoxal, propane dialdehyde, 2-keto propanal, 1,4-butanedial, 2-keto butanal, 2,3-di keto dibutanal, phthaldehyde, salicaldehyde, etc. The preferred delay additive is glyoxal due to its ready availability from a number of commercial sources.

Fracturing fluid compositions that include embodiments of the present invention can further comprise other additives. Many of the specialty additives, particularly those used in stimulation or workover, are designed to improve permeability of either the proppant pack or the reservoir rock matrix. Other additives are included to enhance the stability of the fluid composition itself to prevent breakdown caused by exposure to oxygen, temperature change, trace metals, constituents of water added to the fluid composition, and to prevent non-optimal crosslinking reaction kinetics. The choice of components used in fluid compositions of the present invention is dictated to a large extent by the properties of the hydrocarbon-bearing formation on which they are to be used. Such additives that can be selected include a proppant, breaker, breaker aid, buffer, stabilizer, thickener, surfactant, corrosion inhibitor, antifoaming agent, preservative or a combination thereof.

A method for making a slurry embodiment on a commercial production scale includes dispersing, in no particular order, from 0.1 to 75% suspension weight of particulated water-reactive solids, such as anhydrous borax, and from 0.1 to 5.0% suspension weight of a suspension aid into from 24 to 99% suspension weight of hygroscopic liquid, such as a glycol ether. The solid particles, suspension agent, and hygroscopic liquid are mixed using conventional agitation, such as an overhead mixer, until the solid particles are uniformly dispersed in the hygroscopic liquid and the slurry has developed the desired suspension properties. A dry inert atmosphere may be provided to maintain anhydrous conditions.

The suspension should be easily pumpable and pourable, and remain stable for long periods of time, e.g. 30 days or more, exhibiting minimum separation of solvent and particulate and no packing of the solid particles. The suspended particles should disperse in water better than if the solid is added directly to water. Finally, unlike the direct addition of the unsuspended solids, the particle suspension should not create dust upon addition to water.

The slurry can possesses rheological qualities that permit the use of pumps, mixing equipment and tanks that are typical in well treatment fluid service, substantially avoiding solid deposition on the surfaces of lines and equipment. Under some circumstances, the slurry can be prepared at a plant and shipped to its place of intended use, rather than being made on-site. It can therefore be important that the suspension remain stable for long periods of time, providing enough shelf life for the slurry shipment to be received without significant particulate separation or packing. Stability of the slurry can be facilitated by sufficiently mixing with an adequate quantity of suspension aid.

A more specific embodiment example includes dispersing 40 weight percent anhydrous borax with a grind size of −400 mesh and 2.5 weight percent silica into 57.5 weight percent polyethylene glycol into a mixing vessel with a minimum volume of one liter per kilogram of slurry. The mixture can be agitated using an overhead mixer for a period of one hour. The suspension can be tested for compliance with product specifications by measuring the mixture viscosity on a Brookfield RV viscometer at 20 rpm using a #4 spindle, and observing any supernatant separation, particle packing and other properties as desired by transferring a portion of the contents to a graduated cylinder. If testing results determine that the product specifications have been attained, the slurry can be prepared for storage or shipment. Otherwise, the slurry components can be adjusted as required, and mixed and tested again.

A borax slurry created as previously described can be used as a component of a well treatment fluid, wherein the slurry crosslinks a hydrated polymer composition after a controlled period of delay. A method for making a well treatment fluid on a commercial production scale includes preparing the slurry as previously described and, if necessary, transporting the slurry to the treatment location. At the treatment site, an aqueous fluid and a hydratable polymer can be blended in the usual manner along with any proppant or other additives to form a hydrated base fluid. Then, the slurry is blended with the hydrated polymer at a weight ratio from 0.01 to 100 parts slurry to 1000 parts hydrated base fluid, preferably from 0.1:1000 to 10:1000, more preferably from 0.5:1000 to 5:1000. Finally, the mixture is pumped downhole into the formation.

More specifically, a slurry as previously described can be used to control the delay time of a cross-linked fracturing fluid being pumped into a well bore and subterranean formation to be fractured. For fracturing fluids, a polyol component can also be mixed with the slurry at from approximately 1 to 20 percent by weight of the slurry. The polyol can be supplied with the slurry as a preblend, or added separately or with the hydrated base fluid.

Desirably, an adequate supply of pH modifiers are available at the wellsite. Delayed release of pH modifiers (e.g., acids and bases) can be used to initiate crosslinking, to inhibit crosslinking, to destroy crosslinking, or to enhance the stability of crosslinks over broader time and temperature ranges. Crosslinking by a borate of certain polymers, e.g., guar polymers, occurs at an alkaline pH. While crosslinking of polymers is used to increase viscosity in fracturing fluids, delay of crosslinking is useful to inhibit a chemical from interacting with the bulk fluid or environment (e.g., well bore or formation matrix) until it is released. Often it is preferred that the chemical is not released until the fluid composition is in the matrix. In this case it is optimal for the increase in viscosity (e.g., crosslinking) of the fracturing fluid to be delayed until the fluid is about two-thirds down of the length of the well bore or further, such that the increase in viscosity of the fluid occurs before the fluid and the proppant reach the fracture entrance.

A breaker can be added to the well treatment fluid after the slurry. Breakers are intended for use in reducing the viscosity of viscous fluids. Certain fracturing fluid compositions of the present invention can have a relatively low viscosity as they are pumped into the well bore to the formation, and increase in viscosity as they approach the hydrocarbon-bearing formation. With viscous fracturing fluids, it is often desirable for there to be a subsequent decrease in their viscosity to enhance the flow of production fluids through the established fracture, and breakers can be used to bring about this decrease following the treatment.

The fracturing fluid can be pumped at a rate sufficient to fracture the formation and to place propping agents into the fracture. A typical fracturing treatment would be conducted by hydrating a 0.24 to 0.72% galactomannan based polymer, such as a guar, in a 2% (wt/vol) KCl solution at a pH ranging from about 5.0 to 8.5. The pH can be adjusted with caustic prior to the treatment to provide the desired delay time. During actual pumping, a buffer can be added to increase the hydrated polymer pH to above 8.0, followed by addition of the borate slurry, and typically a breaker and proppant. During the treatment, the area close to the well bore will typically begin cooling gradually, resulting in a decreasing gellation rate. The delay time can be easily readjusted to accommodate the cooling, e.g. by acidifying the treatment fluid.

After the fracture is formed and the pumping is terminated, the viscosity of the fluid must be reduced, typically to below about 10 centipoise. At this viscosity, the fluid can be recovered while leaving the proppant in the fracture. Borate crosslinked galactomannans are pH dependent, requiring an alkaline base fluid having a pH above about 7.8. Glyoxal, in alkaline water, slowly converts to alpha-hydroxy acetic acid, a strong acid, which decreases the pH of the hydrated polymer gel with time. This in turn reduces the amount of available borate ion, since the borate ion is converted to boric acid which does not cross-link, and thus reduces the viscosity of the fracturing fluid.

Suitable proppant materials when used in some embodiments of the invention, include, but are not limited to, sand, walnut shells, sintered bauxite, glass beads, ceramic materials, naturally occurring materials, or similar materials. Mixtures of proppants can be used as well. If sand is used, it will typically be from about 20 to about 100 U.S. Standard Mesh in size. Naturally occurring materials may be underived and/or unprocessed naturally occurring materials, as well as materials based on naturally occurring materials that have been processed and/or derived. Suitable examples of naturally occurring particulate materials for use as proppants include, but are not necessarily limited to: ground or crushed shells of nuts such as walnut, coconut, pecan, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc.; processed wood materials such as those derived from woods such as oak, hickory, walnut, poplar, mahogany, etc. including such woods that have been processed by grinding, chipping, or other form of particalization, processing, etc. Further information on nuts and composition thereof may be found in Encyclopedia of Chemical Technology, Edited by Raymond E. Kirk and Donald F. Othmer, Third Edition, John Wiley & Sons, Volume 16, pages 248-273 (entitled "Nuts"), Copyright 1981, which is incorporated herein by reference. The concentration of proppant can be any concentration known in the art, and will preferably be in the range of from about 0.05 to about 3 kilograms of proppant added per liter of liquid phase. Also, any of the proppant particles can further be coated with a resin to potentially improve the strength, clustering ability, and flow back properties of the proppant.

A gas component may optionally be incorporated into the fluids used in some method embodiments of the invention. The gas component may be produced from any suitable gas that forms an energized fluid or foam when introduced into the aqueous medium. See, for example, U.S. Pat. No. 3,937,283 (Blauer et al.). Preferably, the gas component comprises a gas selected from the group consisting of nitrogen, air, argon, carbon dioxide, and any mixtures thereof. More preferably the gas component comprises carbon dioxide, in any quality readily available. The gas component may assist in the fracturing and acidizing operation, as well as the well clean-up process. The fluid may contain from about 10% to about 90% volume gas component based upon total fluid volume percent, preferably from about 30% to about 80% volume gas component based upon total fluid volume percent, and more preferably from about 40% to about 70% volume gas component based upon total fluid volume percent.

When a gas component is used in some method embodiments of the invention, any surfactant or foaming agent for which its ability to aid the dispersion and/or stabilization of the gas component into the base fluid to form an energized fluid as readily apparent to those skilled in the art may be used. Viscoelastic surfactants, such as those described in U.S. Pat. No. 6,703,352 (Dahayanake et al.) and U.S. Pat. No. 6,482,866 (Dahayanake et al.), are also suitable for use in fluids of the invention. In some embodiments of the invention, the surfactant is an ionic surfactant. Examples of suitable ionic surfactants include, but are not limited to, anionic surfactants such as alkyl carboxylates, alkyl ether carboxylates, alkyl sulfonates, α-olefin sulfonates, alkyl ether sulfates, alkyl phosphates and alkyl ether phosphates, and anionic surfactants containing at least one ethylene glycol unit. Examples of suitable ionic surfactants also include, but are not limited to, cationic surfactants such as alkyl amines, alkyl diamines, alkyl ether amines, alkyl quaternary ammonium, dialkyl quaternary ammonium and ester quaternary ammonium compounds. Examples of suitable ionic surfactants also include, but are not limited to, surfactants that are usually regarded as zwitterionic surfactants and in some cases as amphoteric surfactants such as alkyl betaines, alkyl amido betaines, alkyl imidazolines, alkyl amine oxides and alkyl quaternary ammonium carboxylates. The amphoteric surfactant is a class of surfactant that has both a positively charged moiety and a negatively charged moiety over a certain pH range (e.g. typically slightly acidic), only a negatively charged moiety over a certain pH range (e.g. typically slightly alkaline) and only a positively charged moiety at a different pH range (e.g. typically moderately acidic), while a zwitterionic surfactant has a permanently positively charged moiety in the molecule regardless of pH and a negatively charged moiety at alkaline pH. In some embodiments of the invention, the surfactant is a cationic, zwitterionic or amphoteric surfactant containing an amine group or a quaternary ammonium group in its chemical structure ("amine functional surfactant"). A particularly useful surfactant is the amphoteric alkyl amine contained in the surfactant solution Aquat 944® (available from Baker Petrolite of 12645 W. Airport Blvd, Sugar Land, 77478 USA). In other embodiments of the invention, the surfactant is a blend of two or more of the surfactants described above, or a blend of any of the surfactant or surfactants described above with one or more nonionic surfactants. Examples of suitable nonionic surfactants include, but are not limited to, alkyl alcohol ethoxylates, alkyl phenol ethoxylates, alkyl acid ethoxylates, alkyl amine ethoxylates, sorbitan alkanoates and ethoxylated sorbitan alkanoates. Any effective amount of surfactant or blend of surfactants may be used in aqueous energized fluids of the invention. Preferably the fluids incorporate the surfactant or blend of surfactants in an amount of about 0.02 wt % to about 5 wt % of total liquid phase weight, and more preferably from about 0.05 wt % to about 2 wt % of total liquid phase weight.

EXAMPLES

The examples below are of formulations that have been tested in a laboratory. They illustrate the manner in which delay performance can be controlled or influenced by a number of parameters, including borax grind size, borax hydrate status, pH, crosslinker slurry concentration, polyol concentration, and mixwater temperature. The term "vortex close time" in these examples is taken as an indication of the delay effected in crosslinking a polymer in the sample. It is a measurement of the time it takes a vortex formed in 500 ml of an aqueous polymer solution under shear in a 1 liter high-speed WARING® blender to close after crosslinker is added to the sample. The rotational rate of the blender was adjusted so that the top of the acorn nut securing the impeller was exposed at the bottom of the vortex, and then the crosslinker under investigation was added. After addition of the crosslinker, the polymer solution began to thicken and the vortex eventually closed, leaving the top of the stirred solution smooth. The measurement of time from the addition of crosslinker to closure of the vortex was recorded as the vortex close time.

Example 1A

Anhydrous borax with a grind size of 400 mesh was mixed at a rate of 2.5 grams in 10 grams of ethylene glycol butyl ether (EGBE), along with 0.02 grams of hydroxypropyl cellulose (HPC) polymer. No borax hydrate or polyol was added.

The above crosslinker slurry was mixed in a Waring blender at a ratio of 1:1000 with 3.6 kg/m3 guar and deionized (DI) water at 21-23° C. An aqueous solution of 30% sodium hydroxide was also added at a 1:1000 ratio. The resulting vortex close time was (minutes:seconds) 9:30.

Example 1B

Effect of Crosslinker Slurry Concentration

The same compositions under the same conditions were tested as in Example 1A, with the exception that the crosslinker slurry was mixed with the guar at a ratio of 2:1000, rather than 1:1000. In this test, the resulting vortex close time was 4:40, indicating that gel time can decrease with higher crosslinker concentrations.

Example 2

Effect of Grind Size Mesh

The same compositions under the same conditions were tested as in Example 1A, with the exception that the anhydrous borax grind size was 200, rather than 400. In this test, the resulting vortex close time was found to be 11:30, indicating a positive correlation between gel time and boron-mineral particle sizes, i.e. larger particle sizes increase the gel time.

Example 3A

Effect of Polyol

The same compositions under the same conditions were tested as in Example 1B, with the exception that 1.25 grams of sorbitol were added. In this test, the resulting vortex close time was 4:45, indicating that the presence of polyol can delay gel time.

Example 3B

Effect of Polyol and Temperature

The same compositions under the same conditions were tested as in Example 3A, with the exception that the final mixing temperature was 29° C., rather than 21-23° C. In this test, the resulting vortex close time was found to be 2:40, indicating a negative correlation between gel time and temperature in this range, i.e. higher temperatures reduce gel time.

Example 4

Effect of Borax Hydrate

The same compositions under the same conditions were tested as in Example 1B, with the two exceptions: 1.88 grams of anhydrous borax was added, rather than 2.5, and 0.62 grams of borax hydrate (borax*$10H_2O$) was added. The combined weight of anhydrous borax plus borax hydrate in Example 4 is thus 2.5 grams, the same as the weight of anhydrous borax in Example 1B. In this test, the resulting vortex close time was found to be 2:15, indicating that replacing a portion of anhydrous borax with borax hydrate can decrease gel time.

Example 5

The same compositions under the same conditions were tested as in Example 1B, with the following exceptions: 20 grams of EGBE were added, rather than 10; 5 grams of anhydrous borax were added, rather than 2.5; grind size was a 400/200 mixture, rather than 400; and 0.04 grams of HPC were added, rather than 0.02. In this test, the resulting vortex close time was 8:45. Because EGBE, anhydrous borax and HPC were used at twice the quantities in Example 1B, the much longer gel time of Example 5 may be due to the much larger grind size of the anhydrous borax.

From these findings, it can be observed that factors that affect gel times include: crosslinker concentration, boron-mineral particle size, polyol, temperature, and the use of multiple boron-mineral components.

Each of the patents, publications and other references mentioned herein are hereby incorporated herein by reference in their entirety for the purpose of US patent practice and other jurisdictions where permitted.

Although the methods have been described here for, and are most typically used for, hydrocarbon production, they may also be used in injection wells and for production of other fluids, such as water or brine. The particular embodiments disclosed above are illustrative only, as the invention may be modified and practiced in different but equivalent manners apparent to those skilled in the art having the benefit of the teachings herein. Furthermore, no limitations are intended to the details herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A slurry vehicle useful to deliver water-reactive solids into a downhole treatment fluid, comprising:
   a readily flowable concentrated suspension of particulated water-reactive solids dispersed in a non-aqueous, non-oily, hygroscopic liquid with a suspension aid, wherein the solids are insoluble in the liquid.

2. The slurry vehicle of claim 1 further comprising a viscosity at 25° C. and a shear rate of 3 sec$^{-1}$ less than 100 cP.

3. The slurry vehicle of claim 1 wherein the solids have a non-colloidal particle size less than 400 mesh.

4. The slurry vehicle of claim 1 wherein the solids comprise a slowly soluble boron-containing mineral.

5. The slurry vehicle of claim 4 wherein the slowly soluble boron-containing mineral comprises anhydrous borax.

6. The slurry vehicle of claim 1 wherein the hygroscopic liquid comprises glycol.

7. The slurry vehicle of claim 6 wherein the glycol has a viscosity less than 50 cP and is present in liquid phase in a concentration of at least 50 percent by weight of the liquid phase.

8. The slurry vehicle of claim 7 wherein the glycol is selected from the group consisting of alkylene glycol, dialkylene glycol, trialkylene glycol, alkylene glycol monoalkyl ether, dialkylene glycol monoalkyl ether, trialkylene glycol monoalkyl ether, and combinations thereof.

9. The slurry vehicle of claim 7 wherein the glycol is selected from the group consisting of ethylene glycol, diethylene glycol, triethylene glycol, propylene glycol, dipropylene glycol, tripropylene glycol, 1,3-propanediol, 1,4-butanediol, 1,4-butenediol, thiodiglycol, 2-methyl-1,3-propanediol, pentane-1,2-diol, pentane-1,3-diol, pentane-1,4-diol, pentane-1,5-diol, pentane-2,3-diol, pentane-2,4-diol, hexane-1,2-diol, heptane-1,2-diol, 2-methylpentane-2,4-diol, 2-ethylhexane-1,3-diol, $C_1$ to $C_8$ monoalkyl ethers thereof, and combinations thereof.

10. The slurry vehicle of claim 7 wherein the glycol comprises a glycol ether having the molecular formula R—OCH$_2$CHR$^1$OH, where R is substituted or unsubstituted hydrocarbyl of about 1 to 8 carbon atoms and R$^1$ is hydrogen or alkyl of about 1 to 3 carbon atoms.

11. The slurry vehicle of claim 1 wherein the suspension aid is selected from the group consisting of silica, polymeric suspending agents, organophyllic clay, thixotropic agents, polyacrylic acid, an ether cellulosic derivative, polyvinyl alcohol, carboxymethylmethylcellulose, polyvinyl acetate, thiourea crystals and combinations thereof.

12. The slurry vehicle of claim 1 further comprising a polyol-based component.

13. The slurry vehicle of claim 12 wherein the polyol-based component is selected from the group consisting of sorbitol, mannitol, sodium gluconate and combinations thereof.

14. The slurry vehicle of claim 12 wherein the polyol is present at from 5 to 20 percent by weight of the slurry.

15. The slurry vehicle of claim 1 wherein the slurry is essentially free of wax and oil.

16. A well treatment fluid, comprising:
   a mixture of an aqueous solution of a hydrated polymer capable of gelling in the presence of borate ions and a non-oily slurry of anhydrous borax in liquid glycol with a suspension aid and an optional polyol.

17. The well treatment fluid of claim 16 comprising from 15 to 25 weight percent solids by weight of the fluid.

18. The well treatment fluid of claim 16 wherein the glycol is selected from the group consisting of alkylene glycol, dialkylene glycol, trialkylene glycol, alkylene glycol monoalkyl ether, dialkylene glycol monoalkyl ether, trialkylene glycol monoalkyl ether, and combinations thereof.

19. The well treatment fluid of claim 16 wherein the glycol is selected from the group consisting of ethylene glycol, diethylene glycol, triethylene glycol, propylene glycol, dipropylene glycol, tripropylene glycol, 1,3-propanediol, 1,4-butanediol, 1,4-butenediol, thiodiglycol, 2-methyl-1,3-propanediol, pentane-1,2-diol, pentane-1,3-diol, pentane-1,4-diol, pentane-1,5-diol, pentane-2,3-diol, pentane-2,4-diol, hexane-1,2-diol, heptane-1,2-diol, 2-methylpentane-2,4-diol, 2-ethylhexane-1,3-diol, $C_1$ to $C_8$ monoalkyl ethers thereof, and combinations thereof.

20. The well treatment fluid of claim 16 wherein the glycol comprises a glycol ether having the molecular formula R—OCH$_2$CHR$^1$OH, where R is substituted or unsubstituted hydrocarbyl of about 1 to 8 carbon atoms and R$^1$ is hydrogen or alkyl of about 1 to 3 carbon atoms.

21. The well treatment fluid of claim 16 wherein the polyol is present in an amount effective for shear recovery.

22. A method of introducing a delayed gelling treatment fluid to a subterranean formation treatment comprising the steps of:
   preparing a readily flowable delayed gelling agent comprising a non-oily slurry of anhydrous borax in liquid glycol with a suspension aid and an optional polyol;
   blending together an aqueous fluid and a hydratable polymer capable of gelling in the presence of borate ions to form a hydrated base fluid;
   mixing the hydrated base fluid with the delayed gelling agent;
   pumping the resulting mixture downhole into the formation to form a gel by crosslinking the hydrated polymer with borate ions from the delayed gelling agent;
   wherein the gel formation is effectively delayed during the pumping step until about when the mixture is introduced to the formation.

23. The method of claim 22 wherein the polyol is present in an amount effective for shear recovery.

24. The method of claim 22 wherein crosslinking is delayed for 1 to 20 minutes from time of mixing the hydrated polymer with the borate.

25. The method of claim 22 wherein the gel strength at 10 seconds is less than $1.5 \times 10^3$ Pa.

* * * * *